Feb. 14, 1928. Re. 16,881

A. COSTANTINO

RUBBER HEEL

Original Filed Feb. 18. 1921

INVENTOR—

Alex Costantino

By his Attorney

Nelson W. Mcdonald

Reissued Feb. 14, 1928.

Re. 16,881

UNITED STATES PATENT OFFICE.

ALIX COSTANTINO, OF PROVIDENCE, RHODE ISLAND, ASSIGNOR TO UNITED SHOE MACHINERY CORPORATION, OF PATERSON, NEW JERSEY, A CORPORATION OF NEW JERSEY.

RUBBER HEEL.

Original No. 1,423,399, dated July 18, 1922, Serial No. 446,100, filed February 18, 1921. Application for reissue filed March 15, 1923. Serial No. 625,385.

My invention has reference to improvements in the heels of boots or shoes, and more particularly to improvements in cushion heels such as are usually made of rubber or some similar resilient material or composition.

In nailing rubber heels to the leather heels or heel bases of shoes cement is commonly used, in addition to the attaching nails, to secure a tight joint between the edge of the rubber heel and the edge of the base. The use of cement for this purpose is expensive, both in materials and labor and retards the progress of the shoe through the factory. Furthermore, the cement usually gives way after the shoe has been worn for a short time, permitting the edge of the rubber heel to separate more or less from the base.

Attempts have been made to overcome the difficulties noted above by the insertion in the rubber heel of metallic plates of various shapes but such attempts have heretofore met with failure from the commercial and practical standpoints because inventors have tried to use plates conforming more or less to the size and shape of the heel and extending throughout a large portion of the area thereof. Such plates are wasteful of material and prohibitively expensive to manufacture; furthermore, they interfere with the desired cushioning action of the heel.

It is the object of my invention to provide an improved rubber heel by which the drawbacks above enumerated are eliminated. In the accomplishment of this object I have produced a rubber heel which may be quickly, firmly and tightly secured by nails or the like without the use of cement, which will permanently maintain a tight joint with the leather heel or base to which it is secured and which may be readily manufactured so as to produce a practical and satisfactory product. In the illustrated embodiment of the invention these desirable results are secured by embedding in a rubber heel stiffening and supporting means comprising isolated fastening members of relatively small dimensions, as compared with the size of the heel, which are entirely unconnected and substantially separated from each other, whereby their relation to the portions of the heel immediately surrounding them is preserved under varying conditions of shrinkage or distortion of the heel as a whole. Said members may advantageously be made of spring material and co-operate with certain of the heel attaching nails to effect a secure and accurate attachment of the heel, particularly at its breast corners.

For the purpose of facilitating an understanding of the features and advantages of the invention one satisfactory practical embodiment thereof is described in detail hereinafter and illustrated in the accompanying drawings, in which—

Figure 1:
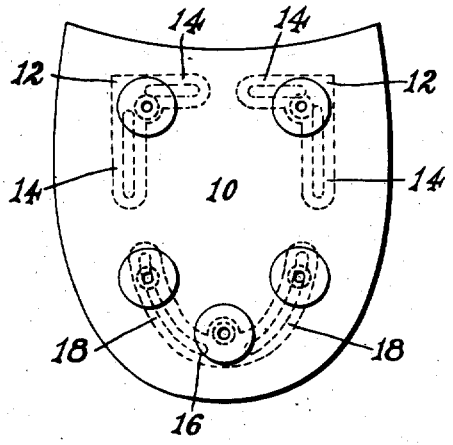
Fig. 1 is a plan view looking at the tread face of my improved rubber heel and indicating the embedded spring fastening and supporting members in dotted lines.
Figure 3:
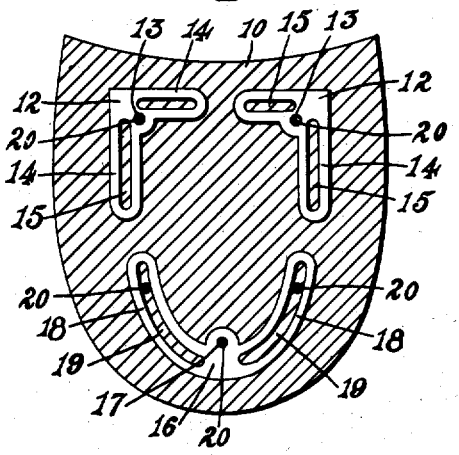
Fig. 3 is a sectional view through the rubber heel taken on line 3, 3 of Figure 2 and showing the spring fastening members in full lines.
Figure 2:
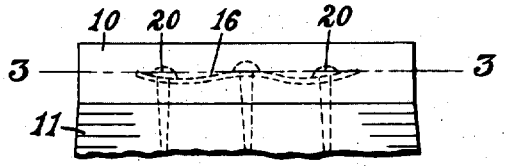
Fig. 2 is a rear elevation of the rubber heel and a portion of a leather heel or base to which it is secured.
Figure 5:
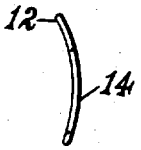
Figure 6:
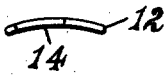

In the drawings, 10 indicates a cushion heel, which may be made of rubber or other suitable resilient material, and 11 indicates the outer portion of a leather heel or the usual base section to which the rubber heel is attached. The rubber heel 10 has embedded in it adjacent to each breast corner an isolated stiffening and supporting element 12 which may conveniently be made of spring steel and, in the illustrated embodiment of the invention, is shown as including two portions disposed at an angle to each other and approximately L-shaped. Each of the members 12 has a single nail hole 13 and arms 14, 14 extending at right angles to each other therefrom, each of said arms having a slot 15. As shown in Figs. 5 and 6 the arms 14 are curved vertically. The member 12, as shown in Figs. 1 and 3, has a projecting angular corner portion which extends from the breast corner nailing location outwardly and forwardly into the breast corner of the heel further than it extends inwardly of the heel from said nail.

Figure 7:
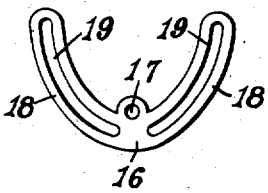
Figs. 7, 8 and 9 are plan, side edge and rear end edge views respectively of the rear fastening member.
Figure 8:
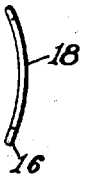
Figure 4:
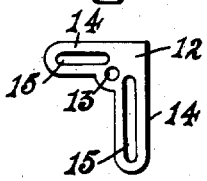
Figs. 4, 5 and 6 are plan, side edge and end edge views respectively, of one of the breast corner fastening members.
Figure 9:
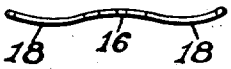

Embedded also in the rear portion of the heel is an approximately U-shaped member 16 having characteristics substantially similar to those of the members 12. The member 16 is provided with a single nail hole 17 and forwardly extending arms 18 which may be curved, as shown in Figs. 8 and 9. The arms 18 are provided with slots 19 which are also disposed at an angle to each other, as shown in Figs. 1, 3 and 7.

The slots permit the rubber to unite through them, thus affording a firm and permanent anchorage in the heel for the spring members, and they also facilitate the proper placing and supporting of the members in the mold during manufacture. They also receive some of the attaching nails 20.

When the attaching nails are driven home their heads engage the members 12, 16, placing the spring arms in a permanent state of tension and holding the rubber heel tightly against the base.

It should be understood that it is within the scope of the invention to use stiffening and supporting inserts of shapes different from those employed in the particular embodiment of the invention illustrated herein and that, while three such inserts are herein illustrated, a different number may be used without departing from the invention.

Having described my invention, what I claim as new and desire to secure by Letters Patent is:—

1. A rubber heel, having a plurality of spring fastening means for securing the rubber heel under spring tension to the heel of a shoe, boot or the like, said spring fastening means consisting of L-shaped spring fastening members embedded in and adjacent to the corners of the rubber heel each having a nail hole, curved spring arms and slots in the spring arms through which the rubber unites, and a U-shaped spring fastening member embedded in and adjacent to the rear end of the rubber heel and having a nail hole, curved spring arms and slots in the spring arms through which the rubber unites, all for the purpose as described.

2. In a shoe, a cushion heel attached by fastenings, including a nail in each breast corner, said heel having embedded in each breast corner an isolated stiffening and supporting member extending outwardly from the respective nail toward the adjacent corner of the heel materially further than it extends inwardly of the heel from said nail.

3. A cushion heel adapted for attachment without cement, comprising a heel having an isolated L-shaped supporting element in each breast corner, each of said supporting elements having its angular portion extending toward the breast corner of the heel from the nailing location nearest to said breast corner.

4. A cushion heel containing, adjacent to each breast corner, a resilient tensioning member, the tensioning members extending longitudinally of the heel and being entirely isolated from each other, whereby their relation to the portions of the heel immediately surrounding them is preserved under varying conditions of shrinkage or distortion of the heel as a whole.

5. A cushion heel having in each breast corner an isolated insert including two approximately horizontal arms, one extending transversely and the other extending longitudinally of the heel.

6. A rubber heel having separate, unconnected tensioning members embedded therein adjacent to the breast corners of the heel, each of said members having a single nail hole and a slot therein.

7. A cushion heel having separated, unconnected, elongated, stiffening members extending in the direction of its side edges and adjacent thereto, said members occupying the region of the breast corners only of the heel.

In testimony whereof I have signed my name to this specification.

ALIX COSTANTINO.